United States Patent [19]

Redpath

[11] Patent Number: 5,630,126

[45] Date of Patent: May 13, 1997

[54] SYSTEMS AND METHODS FOR INTEGRATING COMPUTATIONS INTO COMPOUND DOCUMENTS

[75] Inventor: Richard J. Redpath, Cary, N.C.

[73] Assignee: International Business Machines Corp., Armonk, N.Y.

[21] Appl. No.: 354,687

[22] Filed: Dec. 13, 1994

[51] Int. Cl.$^6$ .................................................. G06F 17/30
[52] U.S. Cl. ........................ 395/614; 395/611; 395/615
[58] Field of Search ................................. 395/600, 575, 395/148; 364/401

[56] References Cited

U.S. PATENT DOCUMENTS

| | | | |
|---|---|---|---|
| 4,885,714 | 12/1989 | Eisenstein et al. | 364/709.01 |
| 5,189,608 | 2/1993 | Yons et al. | 364/408 |
| 5,216,627 | 6/1993 | McClellan et al. | 364/700 |
| 5,224,034 | 6/1993 | Katz et al. | 364/401 |
| 5,235,701 | 8/1993 | Ohler et al. | 395/600 |
| 5,263,167 | 11/1993 | Conner, Jr. et al. | 395/700 |
| 5,371,675 | 12/1994 | Greif et al. | 395/148 |

FOREIGN PATENT DOCUMENTS 2-242-293  9/1994  United Kingdom .

OTHER PUBLICATIONS

Yu et al; "facilitating engineering analysis via a graphical database"; IEEE, 1994; pp. 157–162.

Matthews; "Excel 4 for Windows"; McGraw Hill; 1992.

Kraig Brockschmidt, *Inside OLE 2: The Fast Track to Building Powerful Object–Oriented Applications*, Microsoft Press, pp. 3–25; 429–563 (1993).

Primary Examiner—Thomas G. Black
Assistant Examiner—Cheryl Lewis
Attorney, Agent, or Firm—Gregory M. Doudnikoff

[57] ABSTRACT

Systems and methods for creating and integrating computations within compound documents wherein a compound document having a plurality of integrated computations is created in a computing environment. The compound document is configured to include a document text part and a plurality of math parts positioned in a plurality of locations. A selected first set of math parts within the compound document are expressed as computational functions of a second math part contained within the compound document. If a value is assigned to the second math part, the computational functions of each math part in the selected first set are automatically reevaluated and displayed.

29 Claims, 7 Drawing Sheets

SYSTEMS AND METHODS FOR INTEGRATING COMPUTATIONS INTO COMPOUND DOCUMENTS

FIELD OF THE INVENTION

This invention relates to data processing systems and methods and more particularly to systems and methods for processing documents on data processing systems.

BACKGROUND OF THE INVENTION

The concept of a document is central to many business operations. A document may be defined as a writing (printed or displayed) which conveys information. Documents are typically created, stored and manipulated in a computing environment using a word processing software application, such as WordPerfect or Microsoft Word. The word processing application interacts with an underlying operating system, such as OS/2, DOS or Windows in personal computing environments. Word processing and operating systems also exist for midrange and mainframe computing environments.

Documents containing mathematical computations are also central to many business operations. For example, a loan agreement with a financial institution may include the computation of a monthly payment based upon data for the loan amount, interest rate, and number of payments.

Spreadsheets are used in a variety of business applications for performing mathematical computations. A spreadsheet presents a blank form on which numerical, statistical, financial or other data can be assimilated, organized, manipulated, and calculated. A typical spreadsheet software application, such as Lotus 1-2-3, comprises an array of columns and rows. The intersection of each column and row is a "cell" in which a value, formula, or label may be entered and computations performed.

It is often desirable to incorporate computations and information generated from a spreadsheet and other information entities directly into a document, referred to as a compound document. Compound documents combine into a single container the results of data processing performed by various external applications, typically using text to explain the relationships between the incorporated data.

To meet this need for compound documents, vendors have designed mechanisms for linking objects, such as spreadsheets, with a document. For example, Microsoft Object Linking and Embedding (OLE) allows customized links to be created between certain applications and a document using proprietary linking techniques. The linking techniques utilized by OLE are described in chapters 1, 8, and 9 of *Inside OLE 2: The Fast Track to Building Powerful Object-Oriented Applications with Windows Objects*, by Kraig Brockschmidt, published by Microsoft Press, 1993.

Other customized linking systems are described in U.S. Pat. No. 5,235,701 to Ohler et al. entitled *"Method of Generating and Accessing a Database Independent of Its Structure and Syntax"*; U.S. Pat. No. 5,263,167 to Conner, Jr. et al. entitled *"User Interface for a Relational Database Using a Task Object for Defining Search Queries in Response to a Profile Object Which Describes User Proficiency"*; and U.K. Patent Application GB-2 242 293 A to Heninger entitled *"Apparatus and Method for Dynamic Linking of Computer Software Components"*.

However, linking a spreadsheet with a document has several disadvantages. One disadvantage involves the inherent positional constraints of spreadsheets. Because cells within a spreadsheet are indexed by position, it may not be possible to link individual cells of a spreadsheet with a document. In order to incorporate a computation generated by a spreadsheet, the entire spreadsheet may need to be linked with the document. Consequently, space within a document may be occupied by a spreadsheet having many cells containing nothing at all. Furthermore, if computations need to be located in different portions of a document, a spreadsheet may need to be linked with the document at each location, causing further inefficient use of document space.

Yet another disadvantage in linking a spreadsheet with a document is that existing linking techniques of this nature do not facilitate refreshing the data contained within the linked object. It is often desired to incorporate the latest data into a document rather than old data. However, it may be difficult to perform or update computations contained within the spreadsheet from within the document. In particular, in order to perform the mathematical operations to refresh the data, it may be necessary to bring up the spreadsheet application program, run the computations, and generate an updated spreadsheet. Thus, there is a need to provide a mechanism for refreshing computational data linked with a document without requiring the launching of a separate software application program.

SUMMARY OF THE INVENTION

It is therefore an object of the invention to provide improved systems and methods for creating documents having computations contained therewithin.

It is another object of the present invention to provide improved systems and methods for integrating and refreshing a plurality of computations throughout documents.

These and other objects are provided, according to the present invention, by a math part for a compound document, which allows the user to specify a formula and a location in a document for the results of evaluation of a formula to appear. If a plurality of math parts are located within a document, all are linked together so that related math parts are evaluated and updated upon user input.

In particular, according to the invention, a compound document having a plurality of integrated computations is created in a computing environment including a computing platform which runs a plurality of independent data processing applications. A compound document is configured to include a document text part and a plurality of math parts. The math parts are positioned in spaced apart locations within the compound document.

The term "math part" is referred to as, and used interchangeably with "math cell." However, it is understood that the present invention, whether referred to as a "math part" or a "math cell," is not the same as a "cell" in a conventional spreadsheet.

A selected first set of math parts within the compound document are expressed as computational functions of a second math part also contained within the compound document. After configuration, the user may input a value within the second math part contained within the compound document. In response to the user input, the computational functions of each math part in the selected first set are automatically reevaluated. Each math part in the selected first set automatically displays the results from the reevaluation of its computational function.

According to another aspect of the invention, evaluation proceeds along different lines depending upon the type of user input to the math part. A compound document is configured to include a document text part and a first, second, and third math parts. The first, second, and third math parts are positioned in corresponding first, second and third locations within the compound document.

Each math part may include a name, an associated formula, and an associated value. The formula of the second math part is a computational function of the value of the first math part. The name of a third math part is identical to the name of the first math part.

In response to a user request, a dialog box may be opened for accepting user input of a name and formula for each math part. Also in response to a user request, a dialog box having a plurality of predefined formulas may be opened for designating and accepting a formula.

After configuring the compound document including a document text and first, second, and third math parts, the user may input a predetermined, non-numeric string in the first math part contained within the compound document. The non-numeric string may comprise the math part name or a non-numeric string designated by the user, such as selection of the "ENTER" key.

In response to the user input of a non-numeric string, the computational formula of the first math part is evaluated. The results of this evaluation are displayed at the first location. The results of this evaluation are also assigned as the first value of the first math part.

In response to the assignment of the value to the first math part, the first value of the first math part is communicated to the second and third math parts. A list may be generated of all math parts having the name of the first math part in its formula.

In response to the receipt of the first value by the second math part, the formula of the second math part is reevaluated using the communicated first value of the first math part. The results of this reevaluation are displayed at the second location. In response to the receipt of the first value, by the third math part, the first value is displayed at the third location.

After configuring the compound document including a document text and first, second, and third math parts, the user may also input a numeric string in the first math part contained within the compound document. In response to the user input of a numeric string, the numeric string is assigned to the value of the first math part. The formula of the first math part is not evaluated.

In response to the assignment of the value to the first math part, the first value of the first math part is communicated to the second and third math parts. In response to the receipt of the first value by the second math part, the formula of the second math part is reevaluated using the communicated first value of the first math part. The results of this reevaluation are displayed at the second location. In response to the receipt of the first value, by the third math part, the first value is displayed at the third location.

The invention may be embodied as a math part which is supplied for use in a compound document. In response to a user request, a name, a formula, and a location in a compound document can be assigned to each of a plurality of math parts. Each math part is linked with other math parts having its name in the formulas of the other math parts. For example, a math part with the name "Interest Rate," is linked with all other math parts having the name "Interest Rate" in their formulas.

In response to user input of data in a math part, the results of processing the user data by a math part is communicated to other math parts linked to that particular math part.

Consequently, the results of user input data in a math part causes each linked math part to update.

The present invention may be thought of as a "ragged spreadsheet." A plurality of math parts may be positioned throughout a compound document in a plurality of locations. For example, in a typical loan agreement with a financial institution, computational portions may be interspersed with the text of the agreement. For example, one portion may represent the loan amount, another portion may represent the interest rate, and so forth. In a compound document having a plurality of math parts, each math part may be positioned within the text of a document similar to the positioning of various computational portions within a loan agreement. One math part may represent the loan amount, another math part may represent the interest rate, and so forth.

One advantage of a "ragged spreadsheet" is the ability to instantaneously update all math parts linked to a particular math part which has been assigned a new value by the user. Another advantage is the efficient use of document "real estate" because each math part can be sized as small or large as desired by the user. Enhanced compound documents are thereby provided.

Another advantage of the present invention is that the linking of a plurality of math parts, within either a single compound document or among a plurality of compound documents, is automatic. The user is not required to establish the link between math parts by dragging or any other operation. Consequently, the ability to quickly and easily create compound documents with a plurality of math parts is enhanced.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
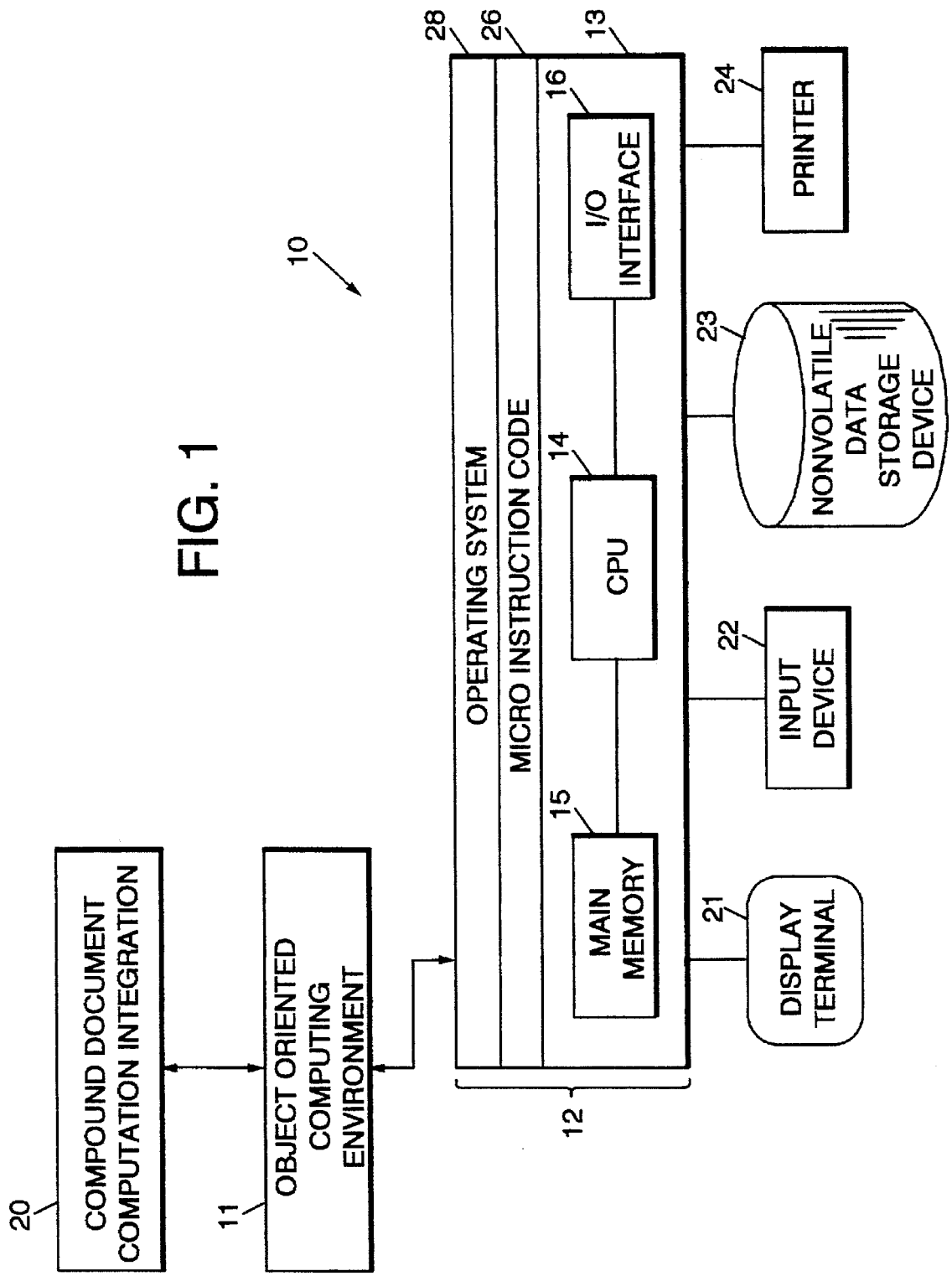
FIG. 1 schematically illustrates a hardware and software environment in which the present invention may operate.

Referring now to FIG. 1, a hardware and software environment in which the present invention may operate will now be described. As shown in FIG. 1, the present invention 20 is a method and system for integrating computations into compound documents in a computing environment 10 which operates on one or more computing platforms 12. It will be understood by those having skill in the art that a computing platform 12 typically includes computer hardware units 13, such as a central processing unit (CPU) 14, a main memory 15, and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computing platform 12 also typically includes microinstruction codes 26 and an operating system 28.

Computing platform 12 may be implemented using an Enterprise System Architecture/370 (also called an "ESA/370") or an Enterprise System Architecture/390 (also called an "ESA/390") mainframe computer, a midrange computer such as an Application System/400 (also called an "AS/400") or a personal computer such as a PS/2 or PS/1 personal computer, all available from the International Business Machines Corporation (IBM), or other conventional computer platforms. It will also be understood by those having skill in the art that computing platform 12 may operate across multiple computer systems. Operating system 28 may be an IBM Multiple Virtual Storage (MVS) operating system or an appropriate personal computer operating system such as DOS, Windows/NT, UNIX or OS/2, or any other conventional operating system.

The present invention is preferably implemented in an object oriented computing environment 11. As is well known to those having skill in the art, in an object oriented computing environment, work is accomplished by sending action request messages to an object which contains data. The object will perform a requested action on the data according to its predefined methods. Objects may be grouped into object classes which define the types and meanings of the data, and the action requests (messages) that the object will honor. The individual objects containing data are called instances of the object class. Object classes can be defined to be subclasses of other classes. Subclasses inherit all the data characteristics and methods of the parent class. They can add additional data and methods and they can override or redefine any data elements or methods of the parent class. Object oriented computing environment 11 may be implemented using object oriented languages such as C++ and Smalltalk. Object oriented computing environment 11 is well known to those having skill in the art and need not be described further herein. Computer usable code or a software program which includes the processes of the present invention may be embodied and transferred on any of a variety of media, such as CD-ROM or diskettes, for use in the computing environment illustrated in FIG. 1. In the preferred embodiment, the code or program will be in the form of an object oriented part or object for use in a compound document environment. Additionally, such code or software program may be embodied in computer memory and distributed or transferred over networks for use by users with their computer systems. These scenarios and means for embodying and distributing function defined by code are well-known in the art and will not be further discussed.

Although compound document computation integration methods and systems of the present invention may operate with any conventional document creating system, it is preferably implemented using the OpenDoc architecture for compound document construction. As is well known to those having skill in the art, the OpenDoc architecture was created as a result of a joint collaboration between Apple Computer, IBM and WordPerfect, and delivers a new paradigm for creating documents by enabling multiple applications to work on the same document.

Figure 2:
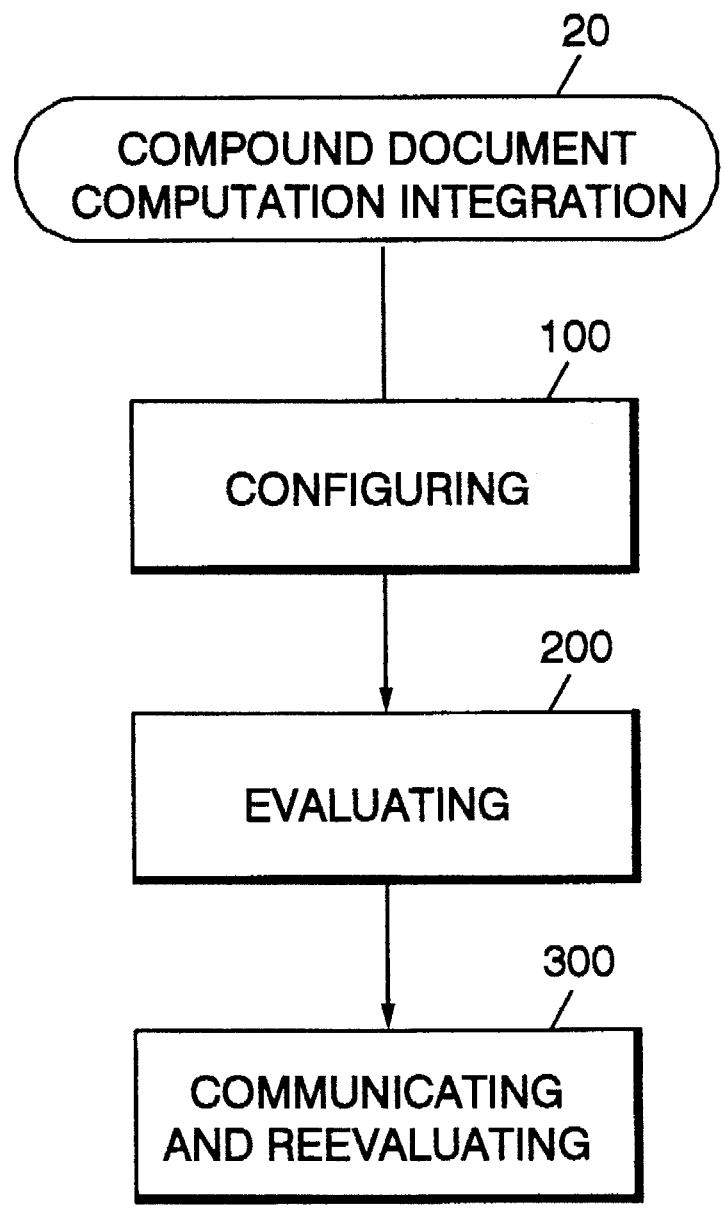
FIG. 2 is a flow chart illustrating operations for creating and integrating computations within a compound document according to the present invention.

Referring now to FIG. 2, compound document computation integration system and method 20 generally includes configuring operation 100, evaluation operation 200 and communicating and reevaluating operation 300. In general, configuring operation 100 configures a first math part including math part size and position within a compound document, and defines name and formula attributes of the math part.

The evaluating operation 200 accepts user input in the form of either numeric or non-numeric strings, and either evaluates a formula contained within a first math part or assigns the value given to the math part. The communicating and reevaluating operation 300 identifies other math parts at the same embedded level as the first math part and having either the same name as the first math part or having a formula containing the first math part name. These identified math parts are then updated using the information communicated from the first math part. The interrupt communication allows the math parts to communicate with each other efficiently. Consequently, a plurality of math parts contained within a compound document can be updated almost instantaneously as a result of this efficiency.

Figure 3:
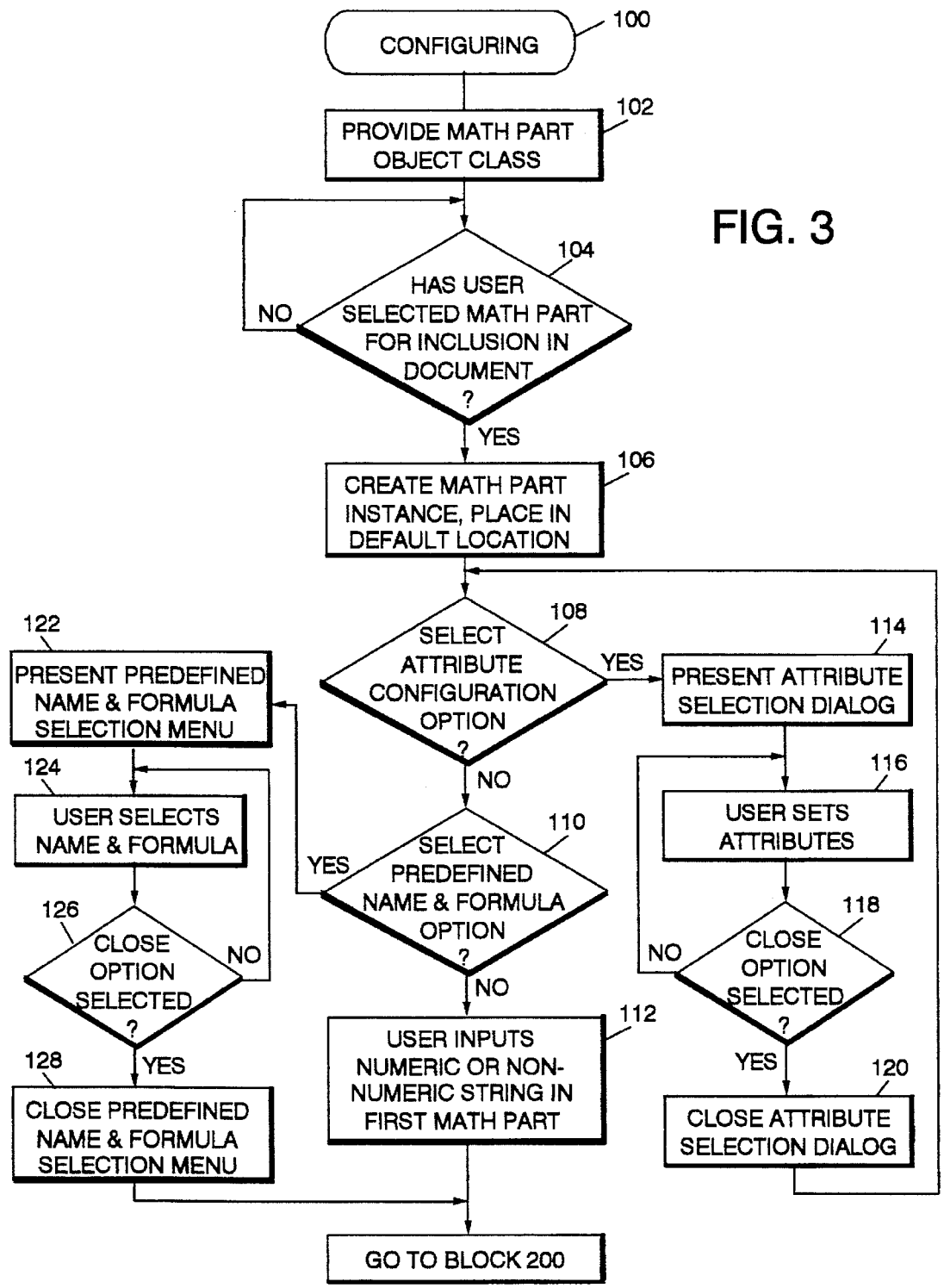
FIGS. 3, 4 and 5 are flow charts illustrating detailed operations for creating and integrating computations within a compound document according to the present invention.

Referring now to FIG. 3, operations for configuring a first math part and providing user input (Block 100 of FIG. 2) will now be described. The description assumes that the compound document computation integration system and method 20 (FIG. 1) is implemented in an object-oriented computing environment. As such, at Block 102, the first math part is provided as an object class within the document processing system. The math part object class comprises the methods described below. When a particular math part is specified, the user is, in effect, defining an instance of the class object which includes the attributes and the incorporated data for use at a specific location within a compound document.

In a preferred embodiment, a math part comprises two components: one that contains the instance data and one that helps the user edit, view and print the math part. The component that contains the instance data is included in the compound document. The component that allows the user to edit, view and print the math part is referred to as the part handler. The part handler is a dynalink library which resides in the compound document creation architecture and which must be present on the system of each active user.

Figures 6, 7:
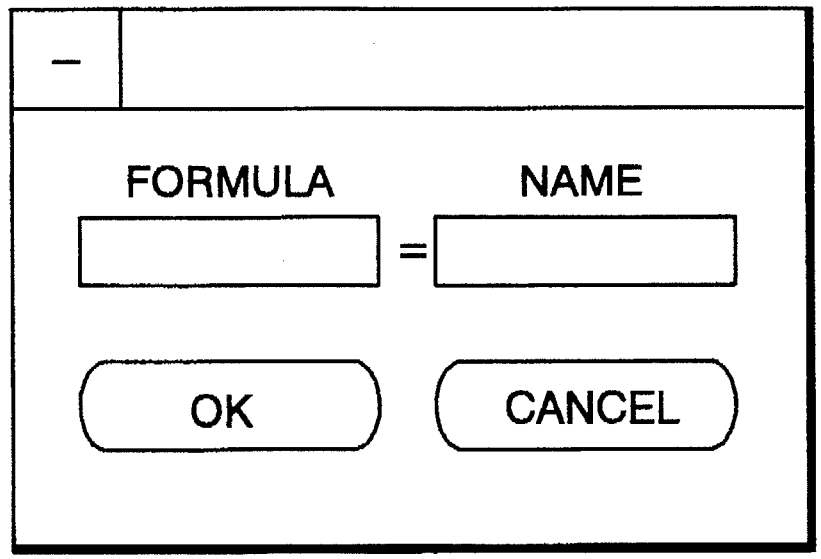
FIG. 6 illustrates a math part attribute selection dialog box according to the present invention. The dialog box is used to assign a name and/or a formula to each math part.
FIG. 7 illustrates a dialog box having a plurality of predefined math part formulas from which a user may select a formula for a math part. By selecting the name of a formula from the dialog box, a formula is automatically assigned to a particular math part, without requiring the user to type each element of the formula.

Still referring to FIG. 3, at Block 104 a query is made as to whether the user has selected the math part for inclusion in a document. If the user has selected a math part for inclusion in the document, then a math part instance is created and a math part window is placed in a default location within a document, for example in the lower left corner of a document (Block 106). If the user selects to configure the attributes of a math part, an attribute selection dialog box is presented (Block 114). FIG. 6 illustrates an example of a math part attribute selection dialog box. The dialog box may be used to assign a name and/or a formula to each math part. If a name, but not a formula, is assigned to a math part, an initial value of zero is assigned to that math part.

Upon selection of the close option at Block 118, the attribute selection dialog box is closed at Block 120 and configuration is complete. The attributes are saved in the math part instance and included within the compound document unless the user selects to display the attribute selection dialog box again.

If the user selects the predefined name and formula option (Block 110) for assigning a name and formula to a first math part, a selection dialog box is displayed (Block 122). FIG. 7 illustrates an example of a predefined name and formula selection dialog box. From this dialog box, a user may select a predefined name and formula for a math part. By selecting a formula from the dialog box, a formula is automatically assigned to a particular math part, without requiring the user to type each element of the formula. By selecting a name from the dialog box, a name is automatically assigned to a particular math part, without requiring the user to type the name. Upon selection of the close option (Block 126), the predefined formula selection dialog box is closed (Block 128). If the user does not select the predefined dialog box option, either numeric or non-numeric data may be entered manually in a first math part (Block 112).

Figure 4:
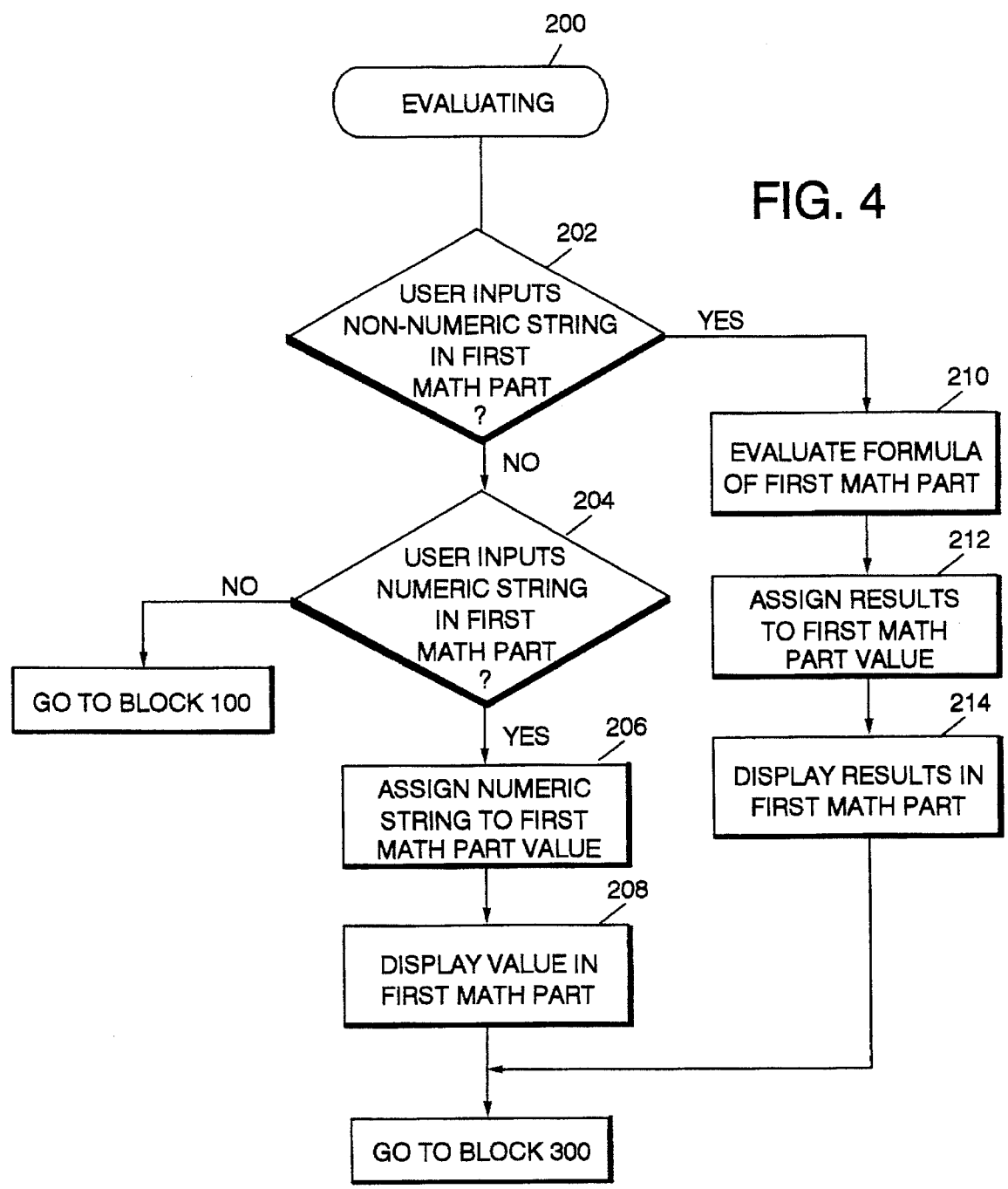

Referring now to FIG. 4, operations for evaluating, displaying and assigning values in a first math part (Block 200 of FIG. 2), will now be described. Evaluating operations begin after the user enters either numeric or non-numeric data from the operations in either Block 112 or 124 of FIG. 3. The basic evaluating algorithm is a recursive descent expression parser with pushdown automata for evaluation with preprocessing pipelining. This algorithm provides a math part with the capability of implicitly recognizing and utilizing data streams without the need for parentheses or special ordering of the data.

Returning to FIG. 4, if the user has entered non-numeric data in the first math part (Block 202), the formula of the first math part is evaluated (Block 210). The results of this evaluation are assigned to the first math part value (Block 212). The results of the evaluation are displayed in the first math part (Block 214). If the user has not entered non-numeric data in the first math part, then a determination of whether numeric data has been entered in the first math part is made at Block 204. If neither numeric nor non-numeric data has been entered in the first math part, the operations revert back to Block 100. If the user inputs numeric data in the first math part (Block 204), the numeric string is assigned to a first math part value (Block 206). This first math part value is displayed in the first math part (Block 208).

Figure 5:
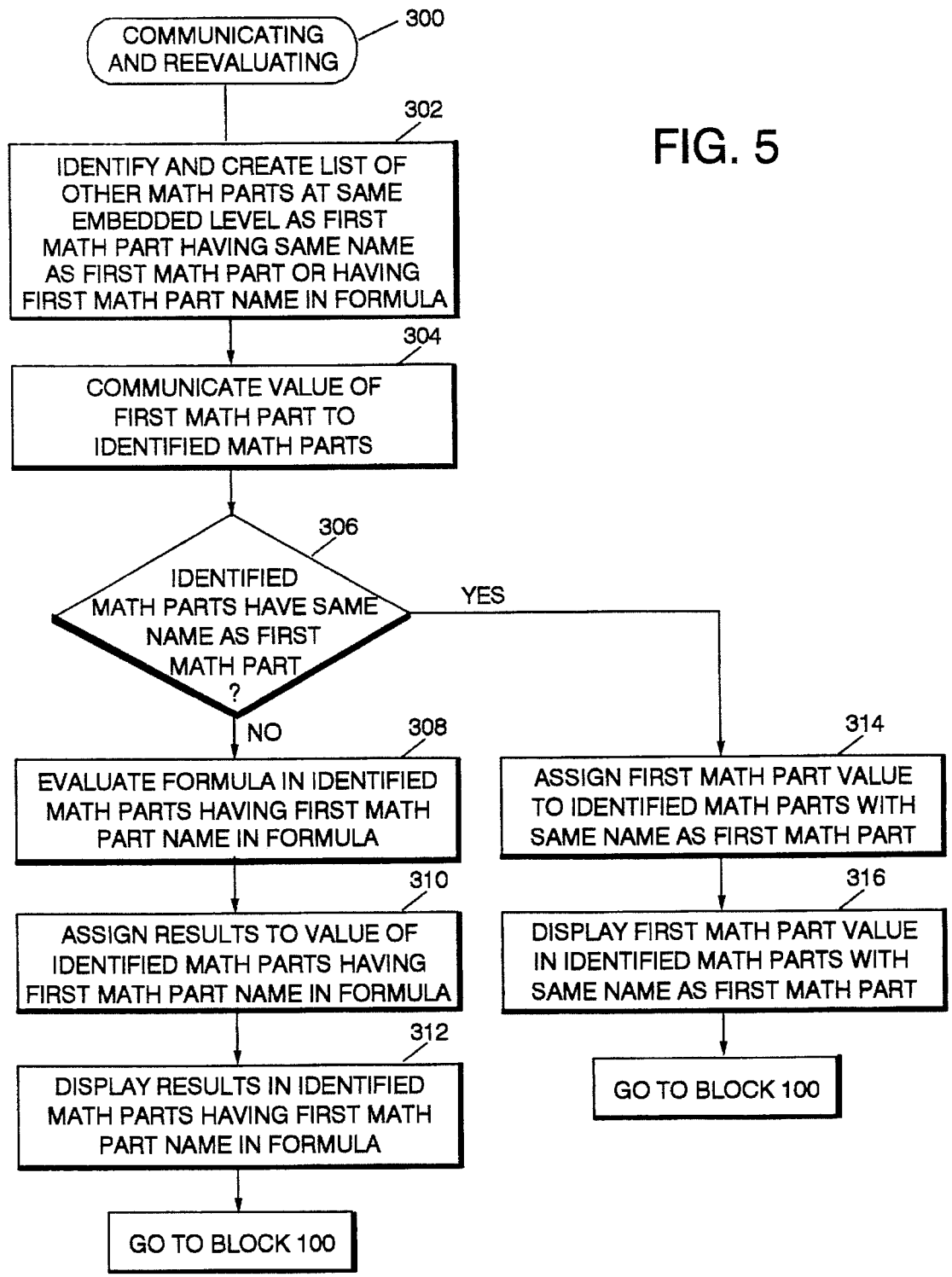

Referring now to FIG. 5, operations for communicating with other math parts, and for reevaluating, assigning and displaying values in other math parts (Block 300 of FIG. 2), will now be described. Once numeric or non-numeric data has been entered in a first math part, all other math parts embedded at the same level as the first math part and having either the same name as the first math part or having the first math part name within a formula, are identified and a list of these math parts is generated (Block 302). The value of the first math part is communicated to each identified math part in the list (Block 304). For identified math parts having the same name as the first math part, the first math part value is assigned to each identified math part (Block 314). The first math part value is displayed in each identified math part having the same name as the first math part (Block 316).

According to another aspect of the invention, once numeric or non-numeric data has been entered in a first math part, all other math parts embedded at the same level as the first math part are identified and a list of these math parts is generated. The value of the first math part is communicated to each identified math part in the list. For identified math parts having the same name as the first math part, the first math part value is assigned to each identified math part. The first math part value is displayed in each identified math part having the same name as the first math part.

For identified math parts not having the same name as the first math part, the formula in each identified math part is evaluated using the value of the first math part (Block 308). The results of this evaluation are assigned to each identified math part having a first math part name in its formula (Block 310). The results of this evaluation are displayed in each identified math part having a first math part name in its formula (Block 312).

To summarize the above operations, a first math part is configured and the desired location for displaying the math part value within a compound document is established. The user may configure the math part attribute settings. The user may enter either numeric or non-numeric data in the first math part, either manually or through the use of a predefined selection dialog box.

If non-numeric data has been entered in a first math part, the formula of the first math part is evaluated. The results are assigned to the first math part value and displayed in the first math part. If numeric data has been assigned to a first math part, the numeric string is assigned to the first math part value and displayed in the first math part.

After the evaluation operations of the first math part are complete, all other math parts embedded at the same level as the first math part, and having either the same name as the first math part, or having the first math part named in a formula, are identified and a list is created. The value of the first math part is communicated to each math part in the list. For each identified math part having the same name as the first math part, the value of the first math part is assigned to the identified math part and displayed within the identified math part. For identified math parts not having the same name as the first math part, the identified math part formula is evaluated using the value of the first math part. The results are assigned to, and displayed in, the identified math part. Consequently, a plurality of math parts within a compound document can be easily and quickly updated.

Figure 8:
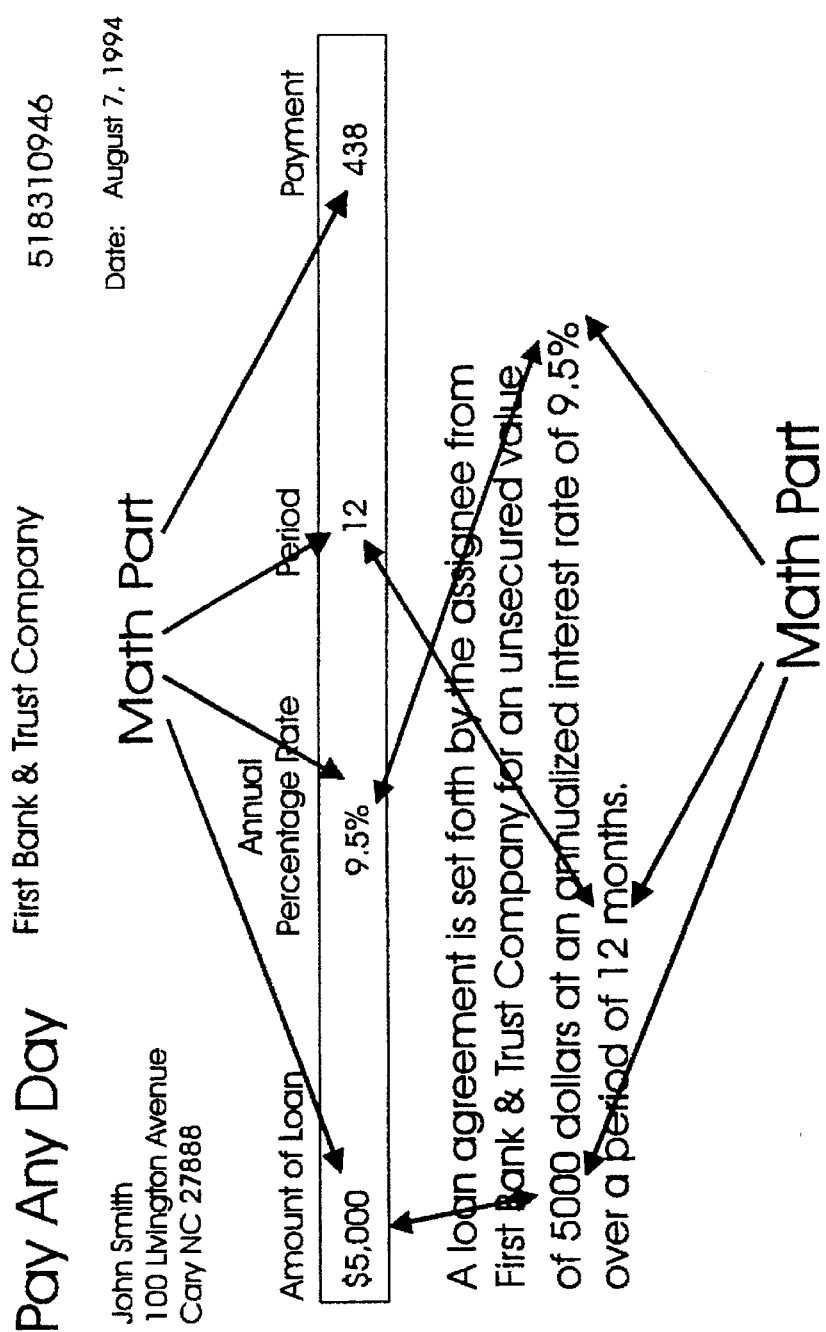
FIG. 8 illustrates an example of a "ragged spreadsheet" according to the present invention, whereby a compound document includes a plurality of math parts.

Referring to FIG. 8, the "ragged spreadsheet" embodiment of the present invention is illustrated in the form of a typical loan statement from a financial institution. Math parts representing the amount of the loan, the annual percentage rate, the period of the loan, and the payment are illustrated. Double-headed arrows indicate the linking of math parts having the same name within the compound document. Furthermore, the math parts are linked according to the formulas assigned to each math part. For example, the user could enter a different value in the "amount of loan" math part and cause the "payment" math part to change and display its value. Because the formula of the "payment" math part is a function of the "amount of loan" math part, any change in the value of the "amount of loan" math part causes it and all math parts linked to it to instantaneously update.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for integrating computations into a compound document in a computing environment including a computing platform, said computation integrating system comprising:

means for configuring a compound document including a document text and first, second and third math parts at corresponding first, second and third locations within said compound document, each math part comprising a name, an associated formula and an associated value, wherein the second formula is a computational function of the first value, and wherein the name of said third math part is identical to the name of said first math part;

means, responsive to user input of a predetermined non-numeric string at said first location, for evaluating the first formula associated with the first math part to produce a result, for displaying said result at said first location and for assigning the result as the first value;

means, responsive to user input of a numeric string at said first location, for assigning said numeric string as the first value, without evaluating the first formula of the first math part;

means, responsive to assignment of a value to said first math part, for communicating the first value of the first math part to said second and third math parts;

means, responsive to receipt of said first value by said second math part, for reevaluating the second formula using the first value, and for displaying the reevaluated formula at the second location; and means, responsive to receipt of said first value by said third math part, for displaying the first value at said third location.

2. A system according to claim 1 wherein said configuring means comprises a dialog box, for accepting user input of a formula and a name for a math part.

3. A system according to claim 1 wherein said configuring means further comprises a dialog box including a plurality of predefined formulas, and means for accepting user designation of one of said predefined formulas.

4. A system according to claim 1 wherein said non-numeric string comprises one of a math part name and a non numeric string which is responsive to user activation of an ENTER function.

5. A system according to claim 1 wherein said communicating means comprises means for generating a list for each of said math parts, each list including names of all remaining math parts, the formulas of which include the name of the associated math part.

6. A system for integrating computations into a document in a computing environment including a computing platform, said computation integrating system comprising:

means for configuring a compound document including a document text and a plurality of math cells at a corresponding plurality of spaced apart locations within said compound document, wherein selected first math cells are expressed as computational functions of a second math cell; and means responsive to user input of a value into said second math cell, for reevaluating said first math cells and for displaying the reevaluated math cells at associated spaced apart locations within said compound document.

7. A system according to claim 6 wherein said configuring means comprises a dialog box, for accepting user input of a formula and a name for a math part.

8. A system according to claim 6 wherein said configuring means further comprises a dialog box including a plurality of predefined formulas, and means for accepting user designation of one of said predefined formulas.

9. A system according to claim 6 wherein said value comprises one of a math part name and a numeric string which is responsive to user activation of an ENTER function.

10. A system according to claim 6 wherein said communicating means comprises means for generating a list for each of said math parts, each list including names of all remaining math parts, the formulas of which include the name of the associated math part.

11. In a computing environment including a computing platform, a math part for use with a compound document comprising:

means for establishing an interface for user assignment of a name, a formula and a location in a compound document for each of a plurality of math parts;

means for linking with each math part, the names of remaining math parts which are used in the formula of the math part; and means, responsive to user input of data into a math part, for communicating the result of processing the user data by the math part, to the linked math parts, such that results of user data input cause the linked math parts to update.

12. A system according to claim 11 wherein said configuring means comprises a dialog box, for accepting user input of a formula and a name for a math part.

13. A system according to claim 11 wherein said configuring means further comprises a dialog box including a plurality of predefined formulas, and means for accepting user designation of one of said predefined formulas.

14. A system according to claim 11 wherein said communicating means comprises means for generating a list for each of said math parts, each list including names of all remaining math parts, the formulas of which include the name of the associated math part.

15. A method for integrating computations into a compound document in a computing environment including a computing platform, said computation integrating method comprising the steps of:

configuring a compound document including a document text and first, second and third math parts at corresponding first, second and third locations within said compound document, each math part comprising a name, an associated formula and an associated value, wherein the second formula is a computational function of the first value, and wherein said third name is identical to said first name;

evaluating the first formula associated with the first math part to thereby produce a result in response to user input of a predetermined non-numeric string at said first location;

displaying said result at said first location;

assigning said result as the first value;

assigning said numeric string as the first value, without evaluating the first formula of the first math part, in response to user input of a numeric string at said first location;

communicating the first value of the first math part to said second and third math parts in response to assignment of a value to said first math part;

reevaluating the second formula using the first value in response to receipt of said first value by said second math part;

displaying the reevaluated formula at the second location in response to receipt of said first value by said second math part;

displaying the first value at said third location in response to receipt of said first value by said third math part.

16. A method according to claim 15 wherein said configuring step comprises the step of presenting a dialog box, for accepting user input of a formula and a name for a math part.

17. A method according to claim 15 wherein said configuring step further comprises the step of presenting a dialog box including a plurality of predefined formulas, and the step of the user accepting designation of one of said predefined formulas.

18. A method according to claim 15 wherein said communicating step comprises the step of generating a list for each of said math parts, each list including names of all remaining math parts, the formulas of which include the name of the associated math part.

19. A method for integrating computations into a document in a computing environment including a computing platform, said computation integrating method comprising the steps of:

configuring a compound document including a document text and a plurality of math cells at a corresponding plurality of spaced apart locations within said compound document, wherein selected first math cells are expressed as computational functions of a second math cell;

reevaluating said first math cells in response to user input of a value into said second math cell; and displaying the reevaluated math cells at associated spaced apart locations within said compound document in response to user input of a value into said second math cell.

20. A method according to claim 19 wherein said configuring step comprises the step of presenting a dialog box for accepting user input of a formula and a name for a math part.

21. A method according to claim 19 wherein said configuring step further comprises the step of presenting a dialog box including a plurality of predefined formulas, and the step of the user accepting designation of one of said predefined formulas.

22. A method according to claim 19 wherein said communicating step comprises the step of generating a list for each of said math parts, each list including names of all remaining math parts, the formulas of which include the name of the associated math part.

23. Computer readable code comprising an object oriented math object for providing a mathematical calculation component in a compound document, said math object comprising:

first subprocesses responsive to input for evaluating the input in accordance with a first formula and producing a mathematical result;

second subprocesses for displaying the result at a user selectable position within the compound document, wherein the math object may be located by the user within the compound document as desired by the user; and third subprocesses for linking said math object to other components within the compound document.

24. Computer readable code comprising an object oriented math object according to claim 23, wherein the input comprises, at least in part, a result produced by a different math object, and said first subprocesses reevaluates the input in accordance with the first formula after a new result from the different math object is received.

25. Computer readable code comprising an object oriented math object according to claim 23, wherein said third subprocesses link said math object to text components within the compound document and update the text components with the input to the first formula or the result produced by the math object as the input to the first formula are modified or the result is reevaluated.

26. In a computing environment, a system for providing an associable mathematical calculation component within a compound document, comprising:

means for locating a user viewable portion of the component within the compound document at a position specified by a user;

means for evaluating input to the component and producing a mathematical result in accordance with a mathematical formula;

means for displaying the mathematical result within the user viewable portion of the component within the compound document; and means for linking the component to other elements within the compound document.

27. A system according to claim 26, wherein the mathematical formula is included in the input.

28. A system according to claim 26, wherein the mathematical formula is predefined within the component.

29. A system according to claim 26, wherein the input comprises, at least in part, data from other elements within the compound document, and said evaluating means re-evaluates the input in accordance with the mathematical formula whenever the input is updated.

* * * * *